(12) United States Patent
Connor

(10) Patent No.: US 9,245,011 B2
(45) Date of Patent: Jan. 26, 2016

(54) DATA MODEL VERSIONING FOR DOCUMENT DATABASES

(75) Inventor: Jason Lilaus Connor, Fort Collins, CO (US)

(73) Assignee: Red Hat, Inc., Raleigh, NC (US)

(*) Notice: Subject to any disclaimer, the term of this patent is extended or adjusted under 35 U.S.C. 154(b) by 318 days.

(21) Appl. No.: 13/041,119

(22) Filed: Mar. 4, 2011

(65) Prior Publication Data

US 2012/0226658 A1 Sep. 6, 2012

(51) Int. Cl.
*G06F 17/30* (2006.01)

(52) U.S. Cl.
CPC .... *G06F 17/30705* (2013.01); *G06F 17/30011* (2013.01)

(58) Field of Classification Search
USPC .................................. 707/609, 695
See application file for complete search history.

(56) References Cited

U.S. PATENT DOCUMENTS

| 5,283,887 | A  | * | 2/1994  | Zachery ........................ 715/210 |
| 7,653,876 | B2 | * | 1/2010  | Ethier et al. .................. 715/249 |
| 7,836,019 | B2 | * | 11/2010 | Barker et al. ................. 707/638 |
| 2010/0088676 | A1 | * | 4/2010 | Yuan et al. .................... 717/120 |

* cited by examiner

*Primary Examiner* — Belix M Ortiz Ditren
(74) *Attorney, Agent, or Firm* — Lowenstein Sandler LLP

(57) ABSTRACT

A data model versioning method may read a first version tag associated with a document database. The method compares the first version tag to a second version tag associated with a current document template of an application, the second version tag indicating a document format used by the current document template for documents created by the application. When the first version tag does not match the second version tag, the method performs a version migration operation to update a document format of documents in the document database.

18 Claims, 5 Drawing Sheets

DATA MODEL VERSIONING FOR DOCUMENT DATABASES

TECHNICAL FIELD

This disclosure relates to the field of document databases and, in particular, to data model versioning for document databases.

BACKGROUND

Document databases are scalable, high-performance, schema-free databases used for the storage of data. Data is stored in a document database as a series of documents, each of which having one or more key/value pairs, which may be referred to as fields. Each field may have a name and a value representing the content stored in the field. Unlike relational databases where each record has the same set of fields and unused field might be kept empty, each document in a document database may have different fields and will not have any empty fields (although some fields may contain a null value indicator). Thus, applications making use of the document database can model data in a more natural way, without the restrictions of a relational database.

Certain applications, such as a software repository management application, may use a document database to store certain data. However, these applications may use a highly structured, code-defined data model for storing data (such as metadata pertaining to the software repositories). This data model may be embodied in a template used to format the data. In addition, the data model (and templates) may change over time, such as in new releases of the application. Since the document database is freely structured and schema-free, the database may contain documents having fields that do not match the data model currently used by the management application. Current systems do not include the ability to verify that that version of the data model used by the application matches the data model used in the document database. If the application attempts to read a document in the document database having a different data model than is expected, it may result in the incorrect data being read or other errors.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for data model versioning for a document database. The data model versioning allows an application, such as a management application, to determine if a data model used by a document database matches the expected data model of the application. In one embodiment, the expected data model of the application is embodied in a document template having a version tag. A comparison module in the management application may compare a version tag in the document database to the version tag of the document template to determine if they match. If the version tags do not match, a migration module in the management application may perform a version migration operation to update a document in the document database to match the expected data model in the document template.

Figure 1:
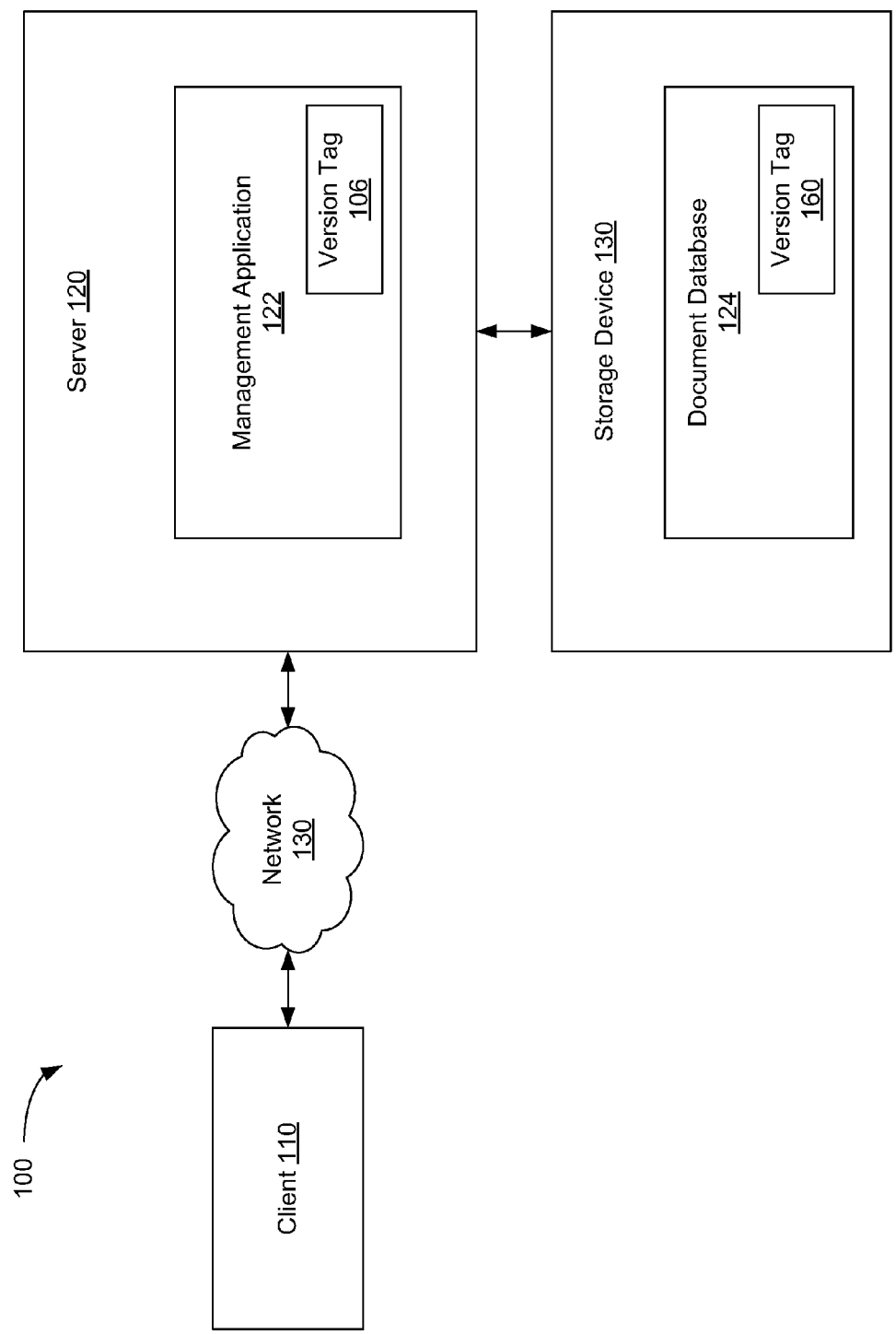
FIG. 1 is a block diagram illustrating a network environment to implement data model versioning for document databases, according to an embodiment.

FIG. 1 is a block diagram illustrating a network environment 100 to implement data model versioning for document databases, according to an embodiment. In one embodiment, network environment 100 includes client 110 and server 120. Client 110 and server 120 may be connected through a network 130, which may be a local area network (LAN), a wide area network (WAN), a global area network (GAN) such as the Internet, or a combination of such networks. In other embodiments there may be any number of clients and/or servers in the network environment, however, for ease of explanation, network environment 100 will be described with only one client 110 and one server 120.

Server 120 may include management application 122. In one embodiment, management application 122 may be a software repository management application that manages one or more software repositories (not shown) and access to the repositories by clients 110. Management application 122 may make use of document database 124 to store information, such as for example, metadata about the software repositories, software packages in the repositories, client subscription information, or other information. In other embodiments, management application 122 may be some other type of application that makes use of document database 124. Document database 124 may be hosted by a storage device 130 which may be coupled to server 120 directly or via a network, such as network 130. Storage device 130 may include mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

Document database 124 may be a free form, schema-free database, such as a NoSQL database. Document database 124 may not require fixed table schema and may avoid join operations. Document database 124 may store data as a series of documents, each of which has one or more key/value pairs, which may be referred to as fields. Each field may have a name and a value representing the content stored in the field. Unlike relational databases, where each record has the same set of fields, each document in document database 124 may have different fields.

In one embodiment, management application 122 may have a highly structured, code-defined data model for storing data in document database 124. This data model may be embodied in one or more templates used to format the data. The template may represent the expected format of the data and may include constraints, such as the names of the fields in a document, the number of fields in a document and the permitted value types for each field. The template may be specific to a particular release of the management application 122 and may include a version tag 106 to uniquely identify the template with respect to previous versions. If changes are made to the template in a new release of management application 122, the data model used by documents in document database 124 may not match the template. In one embodiment, the document database 124 also includes a version tag 160 which can be compared to the version tag 106 of the template to determine if the data models match. If the version tags do not match, management application 122 may migrate the data model used in document database 124 to match that of the current template and also update the version tag 160 in document database 124. This process will be described in more detail below.

Figure 2:
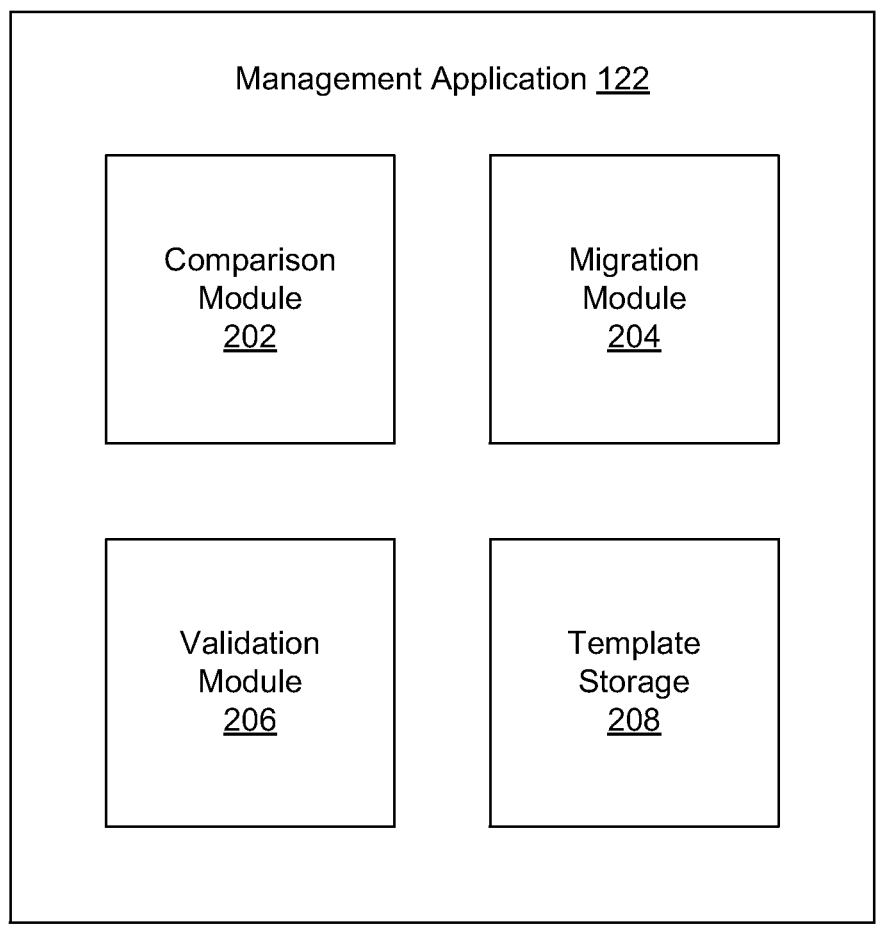
FIG. 2 is a block diagram illustrating a management application for data model versioning for document databases, according to an embodiment.

FIG. 2 is a block diagram illustrating a management application for data model versioning for document databases, according to an embodiment. In one embodiment management application 122 includes comparison module 202, migration module 204, validation module 206 and template storage 208. Comparison module 202 may read the version tag from document database 124 and compare it to the version tag of the current template in management application 122, which may be read from template storage 208. In the event that the version tag from document database 124 does not match the version tag from management application 122, migration module 204 may perform a migration operation in order to update the data model of document database 124. Migration module may read one or more previous template versions from template storage 208 to identify the differences between consecutive versions. Migration module may then make the appropriate changes to the fields of each document in document database 124, so that the data model will match the current template. Once the migration process is complete, migration module 204 may update the version tag of document database 124 to match that of the current template in template storage 208.

Validation module 206 may check the documents in document database 124 to ensure that the migration was performed properly. Validation module may read each field of each document in document database 124 and compare it to the current template in template storage 208. Validation module may ensure that there are the expected number of fields in each document, that each field has the expected name, and that the value of each field is of the expected type. Template storage 208 may include mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

Figure 3A:
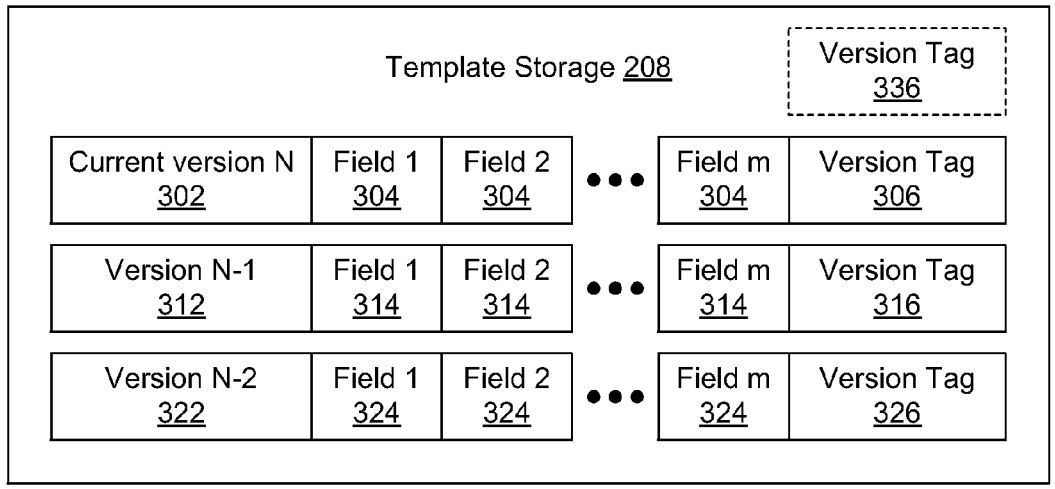
FIG. 3A is a block diagram illustrating a template storage area for data model versioning for document databases, according to an embodiment.

FIG. 3A is a block diagram illustrating a template storage area for data model versioning for document databases, according to an embodiment. Template storage 208 may include one or more templates, identified by a version number 302, 312, 322. The templates may represent an expected data model for the documents in a database, such as document database 124. As management application 122 is updated over time, the expected data model may change (e.g., new fields may be added, old fields may be removed, certain fields may be modified, etc.) resulting in different templates 302, 312, 322. Each time a change is made to the expected data model, a new template may be saved in template storage 208. In one embodiment, template storage 208 may include each version 302, 312, 322 of the template from an initial version up to a current version. In one embodiment, there may be one current version 302 of the template used by all documents in document database 124, however in other embodiments, there may be a plurality of current templates used by different documents, depending on the document type. The correct template may be identified by the version number or by some other identifier.

In one embodiment, each version of the template in template storage 208 may include a number of fields 304, 314, 324. Each version 302, 312, 322 may have the same or different fields, depending on the embodiment. For each field (e.g., 304) in a template 302, template storage 208 may store information about the field 304, such as for example, the name of the field, the type of the field, etc. This information represents the expected format for each document in document database 124 that is used by management application 122 to read document database 124. If the format of a document in document database 124 does not match the data model in the current template 302, an attempt by management application 122 to read the document may result in an error.

In one embodiment, each version of the template in template storage 208 may also include a version tag 306, 316, 326. The version tag 306, 316, 326 may be used to uniquely identify the particular version of the template and to determine if the data model used in document database 124 matches the current version 302. Version tag 306, 316, 326 may be a monotonically increasing integer or other numerical or textual value. For example, the first version 322 of a template used by management application 122 and stored in template storage 208 may be assigned a version tag 326 having an initial value. The version tag 326 may have any known value, such as for example, one. When an update to management application 122 includes a change in the data model of the template, a new template 312 may be stored in template storage 208 and assigned a new version tag 316. The value of version tag 316 may be increased by some known amount (e.g., one) resulting in a new value of version tag 316 of two. Subsequent versions of the template may be assigned a new version tag with a value that is increased by the same amount or other known amount as compared to the value of the version tag of the previous template version. In other embodiments, each version tag 306, 316, 326 may have a random value, as long as the value has not been used in a previous version tag. In another embodiment, template storage 208 may have a single global version tag 336. The global version tag 336 may uniquely identify the current set of template versions 302, 312, 322. Any time a new template version is added to template storage 208 or one of the existing templates is modified, global version tag 336 may be incremented as described above. In this embodiment, each individual template version 302, 312, 322 may or may not include its own individual version tag 306, 316, 326.

Figure 3B:
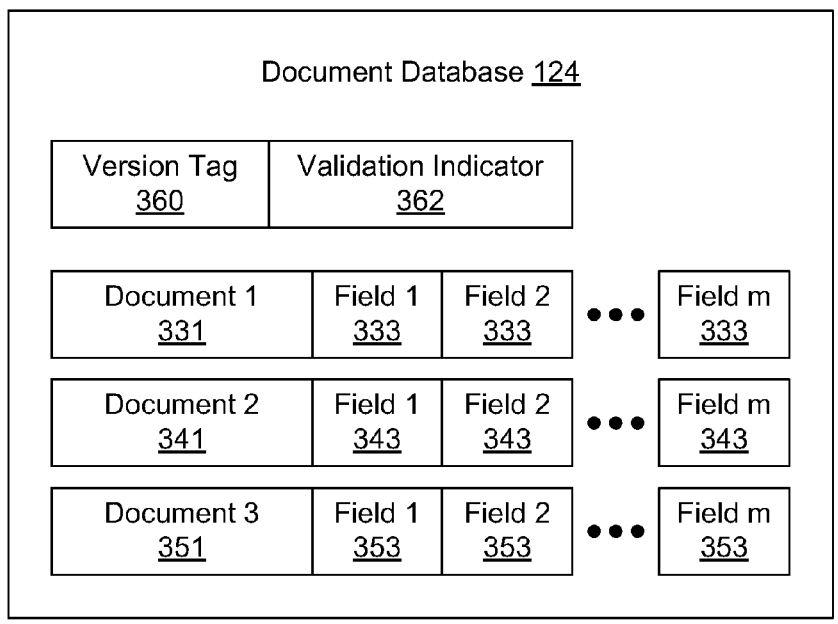
FIG. 3B is a block diagram illustrating a document database for data model versioning, according to an embodiment.

FIG. 3B is a block diagram illustrating a document database for data model versioning, according to an embodiment. In one embodiment, document database 124 includes one or more documents 331, 341, 351 storing the contents of document database 124. Each document 331, 341, 351 may include one or more key/value pairs, which may be referred to as fields 333, 343, 353. Each field 333, 343, 353 may have a name and a value representing the content stored in the field. In one embodiment, each document in document database 124 may have the same number and type of fields, however, in some embodiments, there may be differences in the fields of each document.

In order to prevent errors from occurring when management application 122 attempts to use document database 124, the fields 333, 343, 353 of each document 331, 341, 351 in document database should match the expected fields in the current template 302 used by management application 122. In one embodiment, document database 124 may include version tag 360 to indicate the data model used by the documents 331, 341, 351. When a change is made to document database 124, such as the addition of a new document, management application 122 may write the version tag 306 of template 302 which was used to create the new document as version tag 360 in document database 124. At the same time, management application may verify that all of the documents in document database 124 have the proper data model (i.e., match the current template 302). This process may be referred to as validating, and a validation indicator 362 may be set to indicate that document database 124 has been properly validated. Then, later on, if changes are made to the current template in template storage 208, the version tag 360 in document database can be used to indicate that the documents 331, 341, 351 are formatted using the data model of a previous template version. Management application 122 can then migrate the format of documents 331, 341, 351 to match the data model of the current template, as will be described below.

Figure 4:
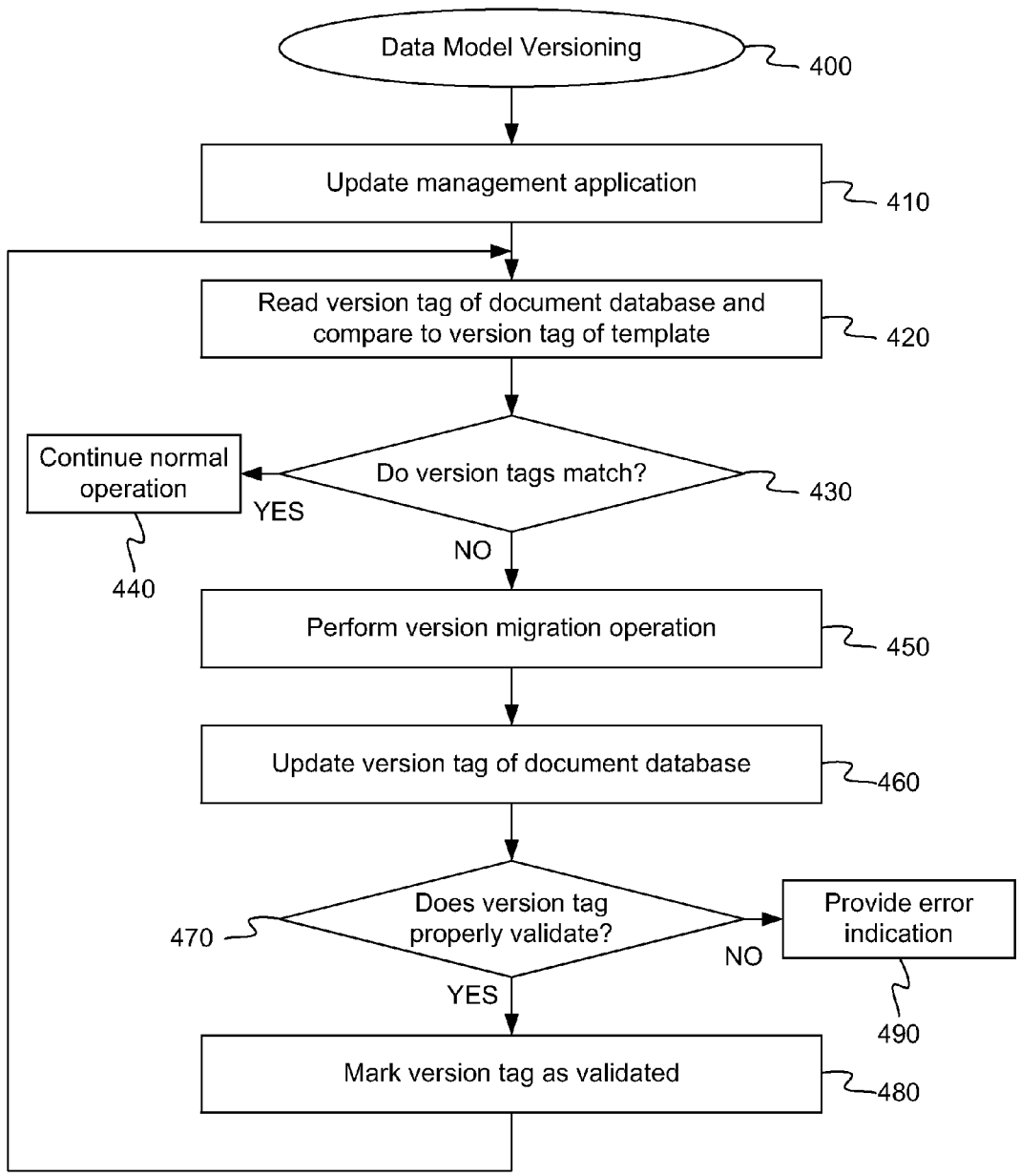
FIG. 4 is a flow diagram illustrating a data model versioning method for document databases, according to an embodiment.

FIG. 4 is a flow diagram illustrating a data model versioning method for document databases, according to an embodiment. The method 400 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to determine the data model version for a document database. In one embodiment, method 400 may be performed by management application 122, as shown in FIGS. 1 and 2.

Referring to FIG. 4, at block 410, method 400 receives an update for management application 122. The update may include a change to the data model for a template used by management application 122. In one embodiment, the change may include a new template stored as current template version 302 in template storage 208. The new template 302 may include one or more changes as compared to a previous template version 312. The current template version 302 may have an associated version tag 306 used to uniquely identify the current template version. In one embodiment, version tag 306 may include a monotonically increasing integer that is increased by a value of one as compared to a previous version tag 316.

At block 420, method 400 reads a version tag 360 of a document database 124 and compares the version tag 360 to the version tag 306 of the current template 302 in template storage 208. In one embodiment, upon initialization of management application 122 after the update at block 410, comparison module 202 reads version tag 360 from document database 124 and compares it to version tag 306. In one embodiment, comparison module 202 may compare version tag 360 to global version tag 336. At block 430, method 400 determines if the version tags match. Comparison module 202 may determine that the version tags 360 and 306 match if they have the same value. If at block 430, method 400 determines that the version tags from document database 124 and the template in template storage 208 match (and a validation indicator 362 for version tag 360 indicates that the document database has been validated), at block 440, method 400 continues normal operation of management application 122. The matching version tags 360 and 306 indicate that the documents in document database 124 have the data model expected by management application 122 and thus management application 122 should be able to read/write to document database 124 without error.

If at block 430, method 400 determines that the version tags from document database 124 and the template in template storage 208 do not match, at block 450 method 400 performs a version migration operation. In one embodiment, migration module 204 of management application 122 migrates the format of the documents in document database 124 to match the format specified by the current template version 302 in template storage 208. The migration may include adding or removing fields to certain documents or making changes to certain fields in document database 124. Migration module 204 may access previous template versions 312, 322 (such as the previous template used by the documents in document database 124) in template storage 208 and compare them to the current template version 302 in order to identify any differences. Migration module 204 may change the fields 333, 343, 353 of any documents in document database 124 that do match the data model of the current template version 302.

Once the migration operation at block 450 is complete, at block 460, method 400 updates the version tag 360 of document database 124. Migration module 204 may write the value of version tag 306 of the current template 302 as the version tag 360 in document database 124. The version tags 360 and 306 should now match, indicating that the documents in document database 124 should match the data model of the current template 302.

At block 460, method 400 performs a validation operation and determines if the version tag 360 properly validates. Validation module 206 of management application may perform the validation operation including comparing each field of each document in document database 124 matches the data model of the current template 302 indicated by the version tag 360 of document database 124. Validation module 206 may iterate over all documents in document database 124 and validate the characteristics such as the number of fields in each document, the names of each field, the type of value stored for each field, etc. Validation module 206 may flag any fields that do not match the expected data model from the current template version 302.

If at block 470, method 400 determines that the document database 124 is properly validated with respect to version tag 360 (i.e., there were no errors found during the validation operation), at block 480, method 400 marks the version tag 360 as validated. Validation module 206 may set a validation indicator 362 for version tag 360. In one embodiment, the validation indicator 362 is a single bit where a value of one indicates that the version tag 360 has been validated, and a value of zero indicates that it has not been validated. In other embodiments, the values may be reversed or some other number of bits or some other indication may be used as the validation indicator 362. If at block 470, method 400 determines that the document database 124 is not properly validated with respect to version tag 360 (i.e., there was at least one error found during the validation operation), at block 490, method 400 provides an indication of the errors. In one embodiment, the validation module 206 may provide an error message to a system administrator indicating the number and location of errors, so that they may be manually remedied.

Figure 5:
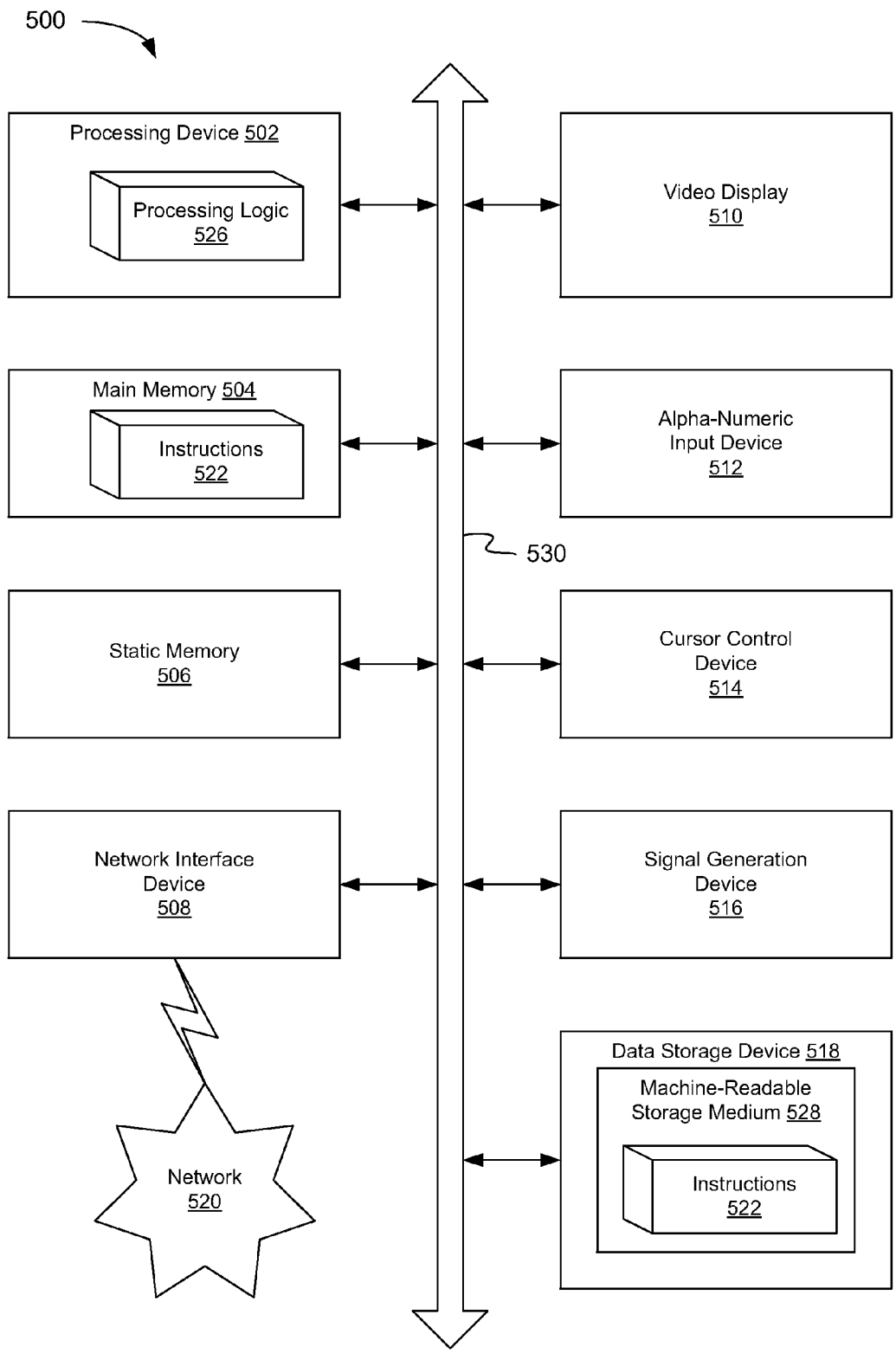
FIG. 5 is a block diagram illustrating one embodiment of a computer system, according to an embodiment.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528, on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-accessible storage media. The instructions 522 may further be transmitted or received over a network 520 via the network interface device 508.

The machine-readable storage medium 528 may also be used to store instructions to perform a method for data model versioning for document databases, and/or a software library containing methods that call the above applications. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
   reading, by a processing device, a first version tag associated with a document database;
   comparing the first version tag to a second version tag associated with a current document template of an application, the second version tag indicating a document format used by the current document template for documents created by the application;
   when the first version tag does not match the second version tag, performing a version migration operation to update a document format of documents in the document database and updating a value of the first version tag associated with the document database to match a value of the second version tag associated with the current document template; and
   performing a validation operation to determine that the document format of each of the documents in the document database match the current document template associated with the second version tag.

2. The method of claim 1, wherein the first version tag represents a version of a document template, according to which, the document in the document database was created.

3. The method of claim 1, further comprising:
   receiving an update to a management application, the update comprising a change to a document template, the document template comprising an expected format for the document in the document database.

4. The method of claim 3, wherein the second version tag represents a version of the document template including the change made by the update to the management application.

5. The method of claim 1, further comprising:
   upon performing the version migration operation, updating the first version tag to match the second version tag.

6. The method of claim 1, wherein the performing the migration operation comprises changing a field of the document in the document database to match a field in a document template associated with the second version tag.

7. A system comprising:
   a memory; and a processing device, operatively coupled to the memory, the processing device to:
- read a first version tag associated with a document database;
- compare the first version tag to a second version tag associated with a current document template of an application, the second version tag indicating a document format used by the current document template for documents created by the application;
- perform a version migration operation to update a document format of documents in the document database when the first version tag does not match the second version tag and update a value of the first version tag associated with the document database to match a value of the second version tag associated with the current document template; and
- perform a validation operation to determine that the document format of each of the documents in the document database match the current document template associated with the second version tag.

8. The system of claim 7, wherein the first version tag represents a version of a document template, according to which, the document in the document database was created.

9. The system of claim 7, wherein the processing device to receive an update to a management application, the update comprising a change to a document template, the document template comprising an expected format for the document in the document database.

10. The system of claim 9, wherein the second version tag represents a version of the document template including the change made by the update to the management application.

11. The system of claim 7, wherein the processing device further to update the first version tag to match the second version tag, upon performing the version migration operation.

12. The system of claim 7, wherein the performing the migration operation comprises changing a field of the document in the document database to match a field in a document template associated with the second version tag.

13. A non-transitory machine-readable storage medium storing instructions which, when executed, cause a processing device to:
- read, by the processing device, a first version tag associated with a document database,
- compare the first version tag to a second version tag associated with a current document template of an application, the second version tag indicating a document format used by the current document template for documents created by the application;
- when the first version tag does not match the second version tag, perform a version migration operation to update a document format of documents in the document database and update a value of the first version tag associated with the document database to match a value of the second version tag associated with the current document template; and
- perform a validation operation to determine that the document format of each of the documents in the document database match the current document template associated with the second version tag.

14. The storage medium of claim 13, wherein the first version tag represents a version of a document template, according to which, the document in the document database was created.

15. The storage medium of claim 13, wherein the instructions further cause the processing device to:
- receive an update to a management application, the update comprising a change to a document template, the document template comprising an expected format for the document in the document database.

16. The storage medium of claim 15, wherein the second version tag represents a version of the document template including the change made by the update to the management application.

17. The storage medium of claim 13, wherein the instructions further cause the processing device to:
- upon the version migration operation being performed, update the first version tag to match the second version tag.

18. The storage medium of claim 13, wherein to perform the migration operation, the processing device to change a field of the document in the document database to match a field in a document template associated with the second version tag.

* * * * *